Patented Jan. 16, 1945

2,367,581

UNITED STATES PATENT OFFICE 2,367,581

PRINTING INK COMPOSITIONS

George F. Hogg, Chicago, Ill., assignor to Hercules Powder Company, Wilmington, Del., a corporation of Delaware No Drawing. Application November 4, 1942, Serial No. 464,521

4 Claims. (Cl. 106—22)

This invention relates to printing ink compositions, and method for their production. More particularly, it concerns a new and useful aniline ink and method for its production.

Heretofore aniline inks, which are primarily solutions of a coal-tar dyestuff in an organic solvent such as alcohol, have been employed whenever a rapid drying ink is desired. However, such simple compositions have disadvantages such as bleeding of the ink caused by moisture, and few are light-fast enough to stand ordinary requirements. Many of the properties of the ink have been improved by the addition of modifying agents. For example, shellac has a high degree of combined hardness and fair elasticity and therefore is of service as a binder in aniline inks. Its disadvantages, however, are the tendency to clog small type and line cuts, and to dry and become sticky on the roll. Furthermore, shellac is no longer readily available for this use because of present war priorities. It, therefore, becomes highly desirous to find a product which can be used as an efficient and economical binder in aniline ink.

Now, in accordance with this invention, it has been found that hydrogenated rosin may be included in a printing ink composition, such as aniline ink, as a binder and a new and useful printing ink composition thereby obtained. Thus, the process of this invention comprises mixing together a dye base, containing a mordant, and an ink base, containing hydrogenated rosin, and heating at a temperature not exceeding 130° F. A new and useful printing ink composition is thus produced containing hydrogenated rosin.

Having thus indicated in a general way the nature and purpose of the invention, the following examples are given to illustrate the practice thereof. It is to be understood that the following examples are given by way of illustration and not by way of limitation. In the examples, the ingredients are given in parts by weight, unless otherwise specified.

Example 1

An ink base was prepared by dissolving four hundred fifty parts of hydrogenated rosin in 729 parts of 2B alcohol and adding 10.8 parts of glacial acetic acid.

A large batch of dye base was prepared in alcohol, so that 222 parts of solution contained 34 parts of Victoria green base and 43.3 parts of glacial acetic acid.

A printing ink composition was prepared as follows:

34 parts of tannic acid were warmed in 81 parts 2B alcohol. About 3 parts of water were added to the solution. 202 parts of 2B alcohol were heated almost to boiling. One-half of the heated alcohol was added to the tannic acid solution and the other half to 222 parts of dye base which had also been warmed, which had been prepared as above. The resulting dye solution was poured into the tannic acid solution and while stirring rapidly, 133.5 parts of the ink base were mixed in. The mixture was then warmed on a hot plate but care taken not to heat over 130° F. as this causes precipitation of the dye. The ink was removed from the hot plate and stirred until cool and sludge filtered off. The resulting ink composition was compared to a printing ink composition containing an equal amount by weight of shellac to replace the hydrogenated rosin. The inks were printed by stamping with a rubber stamp on 53 lb. PX clay coated paper, moisture-proof glassine paper and moisture-proof Cellophane.

The results of this test indicated that hydrogenated rosin may be used as an efficient binder in a printing ink composition, such as aniline ink, and may be substituted wholly or in part for shellac with substantially equivalent performance. When these inks were flow coated on clay-coated paper, dried and exposed on the Fade-Ometer for four hours, the samples showed approximately the same discoloration. This indicated a similar resistance to ultraviolet light, one of the most important considerations in aniline inks. The printing ink containing hydrogenated rosin, however, had a lower viscosity than ink containing shellac at equivalent concentrations. Thus, greater coverage was obtained with printing ink containing hydrogenated rosin.

Example 2

An ink was prepared by dissolving seventy-seven parts of hydrogenated rosin in 330 parts denatured alcohol and adding 22 parts glacial acetic acid. A dye base was prepared by dissolving 450 parts Victoria blue and 450 parts tannic acid in 450 parts denatured alcohol. The two solutions were mixed together on a hot plate at a temperature not exceeding 130° F. The solution was cooled and filtered and sludge removed. It was found possible to incorporate up to 600 parts titanium dioxide without exceeding a practical printing viscosity, whereas an ink similarly prepared using shellac instead of hydrogenated rosin became too viscous for printing after incorporating 450–475 parts titanium dioxide pigment.

Example 3

An ink base was prepared by dissolving fifty-nine parts hydrogenated rosin in 250 parts denatured alcohol and adding 17 parts glacial acetic acid. A dye base was prepared by dissolving 312 parts rhodamine, 28.5 parts auramine and 340 parts tannic acid in 335 parts denatured alcohol. The two solutions were mixed together on a hot plate at a temperature not exceeding 130° F., cooled and filtered. The resulting red ink had approximately 20% greater coverage than a similar ink made with shellac in place of the hydrogenated rosin.

It was found that hydrogenated rosin proved an efficient and economical binder in a printing ink composition. In the examples, typical formulas have been given showing the amount of hydrogenated rosin used in the compositions. However, the amount of hydrogenated rosin in the compositions may vary. Generally speaking, however, an equal amount by weight of hydrogenated rosin is used as is customary with shellac. Thus, hydrogenated rosin may be entirely substituted for the shellac, or, if desired, only a part of the shellac may be replaced by hydrogenated rosin.

The hydrogenated rosin which may be employed in the process of the invention may be produced, as is well known in the art, by contacting wood or gum rosin or the acids contained therein with hydrogen and a suitable hydrogenation catalyst. Thus, by contacting rosin in a fluid condition with hydrogen in the presence of an activated base metal hydrogenation catalyst under a pressure in the range of about 200 to 15,000 pounds per square inch and at a temperature of about 125° C. to about 225° C., a hydrogenated product useful in this invention will be obtained. Hydrogenated rosin may also be obtained by contacting rosin dissolved in a suitable solvent with hydrogen and a noble metal hydrogenation catalyst, as for example, platinum, palladium, etc., as is well known in the art. The hydrogenated rosin obtained by any of the above methods will have varying degrees of saturation depending on the actual conditions employed. For use in the present invention, a hydrogenated rosin having a saturation value corresponding to at least about 50 per cent saturation of both double bonds of the rosin acid contained in the rosin will be preferred, although rosins of lower saturation may also be employed. Hydrogenated rosin having a saturation of about 50 to about 95 per cent of both double bonds will be particularly desirable in the production of the novel printing ink composition of the invention. After hydrogenation, the hydrogenated rosin may be subjected to vacuum distillation to remove the light end or to separate any particular fraction. If desired, it may be subjected to a refining treatment with a selective color-body solvent or absorbent as furfural, phenol, fuller's earth, etc. The hydrogenated rosin used will generally have an acid number above 100 and preferably from about 135 to about 185.

While Victoria green base, Victoria blue, rhodamine and auramine have been used in the example as the aniline dyes, other suitable dyes may be used such as methyl violet, brilliant green, chrysoidine, safranine, etc. Tannic acid has been used as the mordant. However, other suitable mordants, for instance oxalic acid, may be used.

As shown in the example, ethyl alcohol has been used as the solvent. However, other suitable solvents for the hydrogenated rosin may be used such as methyl and butyl alcohols, ethyl acetate, ketones and ethers, etc.

In carrying out the process of this invention, an ink base may be prepared by dissolving hydrogenated rosin in a suitable solvent, for example, alcohol and adding glacial acetic acid. A dye base may be prepared by dissolving a suitable dye in a suitable solvent such as alcohol, and adding glacial acetic acid. The printing ink composition may be prepared, for example, by warming a mordant, such as tannic acid, in an alcohol solution. If desired, a small amount of water may be added to the solution. A suitable amount of alcohol may then be heated and half added to the mordant solution, the other half being added to the dye base which has been warmed. The resulting dye solution is then mixed with the mordant and while stirring rapidly, a suitable amount of ink base may be mixed in. The mixture may then be warmed, for example, on a hot plate, but at a temperature not exceeding 130° F. The ink may then be removed from the hot plate and stirred until cool and any sludge filtered off. If desired, other methods of preparing the ink base, dye base and printing ink composition may be employed.

Printing ink compositions containing hydrogenated rosin produce a new and useful printing ink composition characterized by its rapid drying, with little "offsetting" and "slipsheeting" trouble connected with the printed films. It possesses good waterproofness and gives good resistance to ultraviolet light. Hydrogenated rosin is readily available, and a substantial saving can be realized over the use of shellac or other binders. Furthermore, printing inks containing hydrogenated rosin have a further advantage over printing inks containing shellac in that the hydrogenated rosin printing inks have a lower viscosity at equivalent solids concentration. This lower viscosity found with hydrogenated rosin insures greater coverage and is especially important in inks employing titanium oxide or similar pigments to improve light fastness, as much larger proportions of these materials may be incorporated before maximum printing viscosity is reached.

What I claim and desire to protect by Letters Patent is:

1. An aniline ink comprising an ink base, said ink base containing hydrogenated rosin, and a dye base, said dye base containing a suitable mordant.

2. An aniline ink comprising an ink base, said ink base containing hydrogenated rosin, and a dye base, said dye base containing tannic acid.

3. In a method of preparing an aniline ink, the steps comprising mixing together a dye base containing a suitable mordant, and an ink base containing hydrogenated rosin, and heating at a temperature not exceeding 130° F.

4. An aniline ink comprising an ink base, said ink base containing hydrogenated rosin, and a dye base, said dye base containing oxalic acid.

GEORGE F. HOGG.